(12) United States Patent
Takahashi (10) Patent No.: US 11,485,592 B2
(45) Date of Patent: Nov. 1, 2022

(54) SHEET FEEDING APPARATUS INCLUDING AN ELECTRIC CIRCUIT BOARD

(71) Applicant: CANON KABUSHIKI KAISHA, Tokyo (JP)

(72) Inventor: Kakeru Takahashi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 16/850,104

(22) Filed: Apr. 16, 2020

(65) Prior Publication Data

US 2020/0331716 A1 Oct. 22, 2020

(30) Foreign Application Priority Data

Apr. 18, 2019 (JP) .............................. JP2019-079127

(51) Int. Cl.
| | |
|---|---|
| *B41J 29/00* | (2006.01) |
| *B65H 1/26* | (2006.01) |
| *G03G 15/00* | (2006.01) |
| *G03G 21/16* | (2006.01) |
| *H02B 13/025* | (2006.01) |

(52) U.S. Cl.
CPC .............. *B65H 1/266* (2013.01); *B41J 29/00* (2013.01); *G03G 15/6502* (2013.01); *G03G 15/80* (2013.01); *G03G 21/1619* (2013.01); *H02B 13/025* (2013.01); *B65H 2407/10* (2013.01)

(58) Field of Classification Search
CPC ........................................................ B41J 29/00
See application file for complete search history.

(56) References Cited

U.S. PATENT DOCUMENTS 6,327,155 B1 * 12/2001 Niepmann ........... H05K 7/1425
361/752
2014/0371359 A1 * 12/2014 Akiba ...................... C08J 3/203
524/125

FOREIGN PATENT DOCUMENTS

| JP | 2007-315640 A | 12/2007 |
|---|---|---|
| JP | 2009-069188 A | 4/2009 |

* cited by examiner

*Primary Examiner* — Ibrahim Siddo
(74) *Attorney, Agent, or Firm* — Venable LLP (57) ABSTRACT

A sheet feeding apparatus includes an upper support portion formed integrally with a side plate and configured to support an electric circuit board; an upper opening portion formed in the side plate near the upper support portion; a lower support portion provided at a separate part mounted to the side plate and configured to support the electric circuit board; and a lower opening portion provided between the side plate and the separate part. All line segments having a length of 50 mm or less, among line segments extending from arbitrary points in a main body portion of a sheet cassette, through arbitrary points in the upper opening portion, to the electric circuit board, form an angle of 45° or more with respect to a vertical line, and the lower opening portion has a dimension of 5 mm or less or a width of 1 mm or less.

7 Claims, 8 Drawing Sheets

SHEET FEEDING APPARATUS INCLUDING AN ELECTRIC CIRCUIT BOARD

BACKGROUND OF THE INVENTION

Field of the Invention

The present invention relates to a sheet feeding apparatus including an electric circuit board.

Description of the Related Art

Hitherto, a copying machine, a printer, a facsimile machine, a multifunction peripheral thereof, and other such image forming apparatus each include a sheet feeding apparatus configured to feed a sheet to an image forming portion. The sheet feeding apparatus feeds, from a sheet cassette configured to store a sheet, the sheet by a feed roller driven by a motor. The sheet feeding apparatus includes an electric circuit board configured to control power supply to the motor in order to control the rotation of a feed roller. The sheet feeding apparatus including such an electric circuit board employs a configuration for preventing a fire from spreading to another part when a fire has occurred due to, for example, an abnormality in an electric circuit on the electric circuit board. In Japanese Patent Application Laid-Open No. 2007-315640, an electric circuit board is covered by a casing made of a flame retardant material or an incombustible material to thereby prevent a fire from spreading to another part when the electric circuit board causes a fire.

Figure 8A:
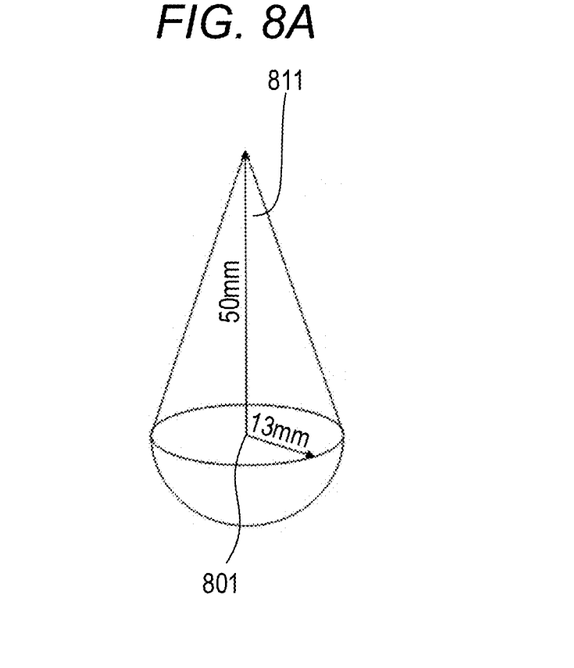
FIG. 8A and FIG. 8B are diagrams for illustrating a fire spreading range from a source of fire, which is specified in the standard IEC 62368-1 2nd Edition.
Figure 8B:
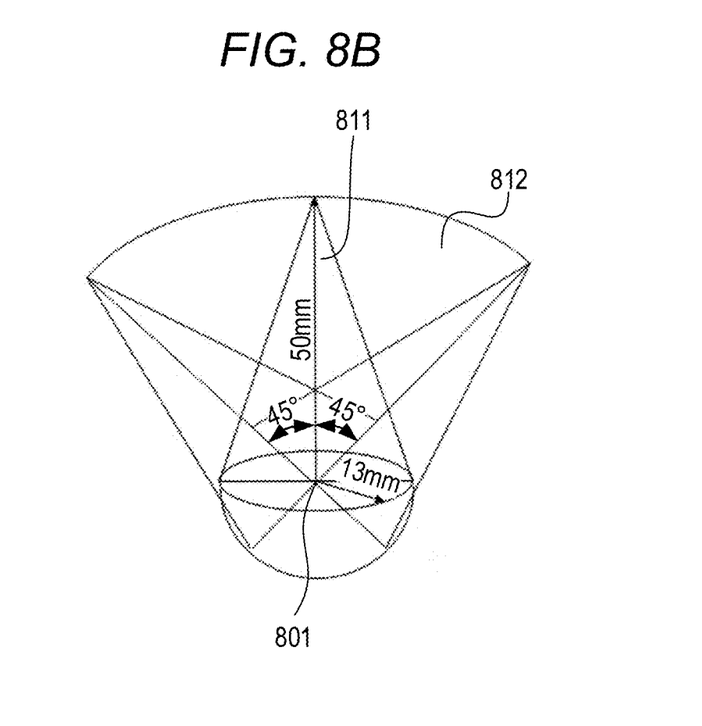

However, the standard IEC 62368-1 2nd Edition, which is to be applied from Dec. 20, 2020, may not be able to be satisfied merely by employing a related-art fire spread prevention configuration. FIG. 8A and FIG. 8B are diagrams for illustrating a fire spreading range from a source 801 of fire, which is specified in the standard IEC 62368-1 2nd Edition. In accordance with the standard IEC 62368-1 2nd Edition, as illustrated in FIG. 8A, it is required to regard, as a fire spreading range 811, a range of 50 mm from the source 801 in the vertical direction and 13 mm from the source 801 in directions other than the vertical direction. In addition, under an environment in which an airflow direction is not identified, as illustrated in FIG. 8B, a range in which the fire spreading range 811 is inclined by 45° from the vertical direction to all directions may be considered as a fire spreading range 812. Furthermore, in accordance with the standard IEC 62368-1 2nd Edition, it is not possible to arrange a resin material having a flame retardant grade lower than the flame retardant grade V-2 within the fire spreading range 811 or 812.

SUMMARY OF THE INVENTION

According to an embodiment of the present invention, there is provided a sheet feeding apparatus which satisfies the standard IEC 62368-1 2nd Edition while suppressing an increase in number of components.

In order to solve the above-mentioned object, according to an embodiment of the present invention, there is provided a sheet feeding apparatus, comprising: an electrical component; a main frame; a side plate which forms a part of the main frame; a sheet cassette supported within the main frame so as to be withdrawable from the main frame, and including a main body portion made of a resin; an electric circuit board arranged on an opposite side of the sheet cassette with respect to the side plate, and configured to supply power to the electrical component; an upper support portion formed integrally with the side plate, and configured to support the electric circuit board; an upper opening portion provided in the side plate in a vicinity of the upper support portion; a lower support portion provided at a separate part mounted to the side plate, and configured to support the electric circuit board; and a lower opening portion provided between the side plate and the separate part, wherein all line segments having a length of 50 mm or less, among line segments starting from arbitrary points in the main body portion of the sheet cassette, passing through arbitrary points in the upper opening portion, and extending until reaching the electric circuit board, form an angle of 45° or more with respect to a vertical line extending from bottom to top along a gravity direction, and wherein the lower opening portion has a dimension of 5 mm or less with respect to every direction or a width of 1 mm or less.

Further features of the present invention will become apparent from the following description of exemplary embodiments with reference to the attached drawings.

DESCRIPTION OF THE EMBODIMENTS (Sheet Feeding Apparatus)

Figure 1A:
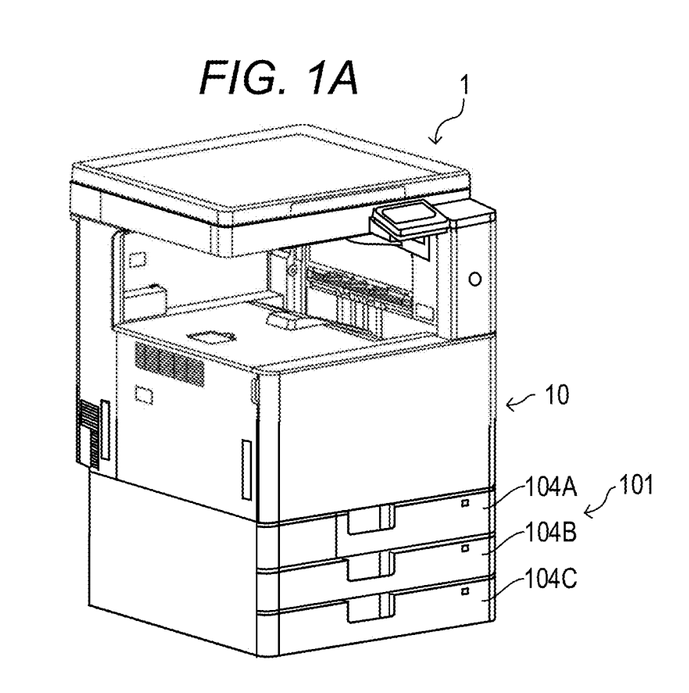
FIG. 1A and FIG. 1B are views for illustrating a sheet feeding apparatus.
Figure 1B:
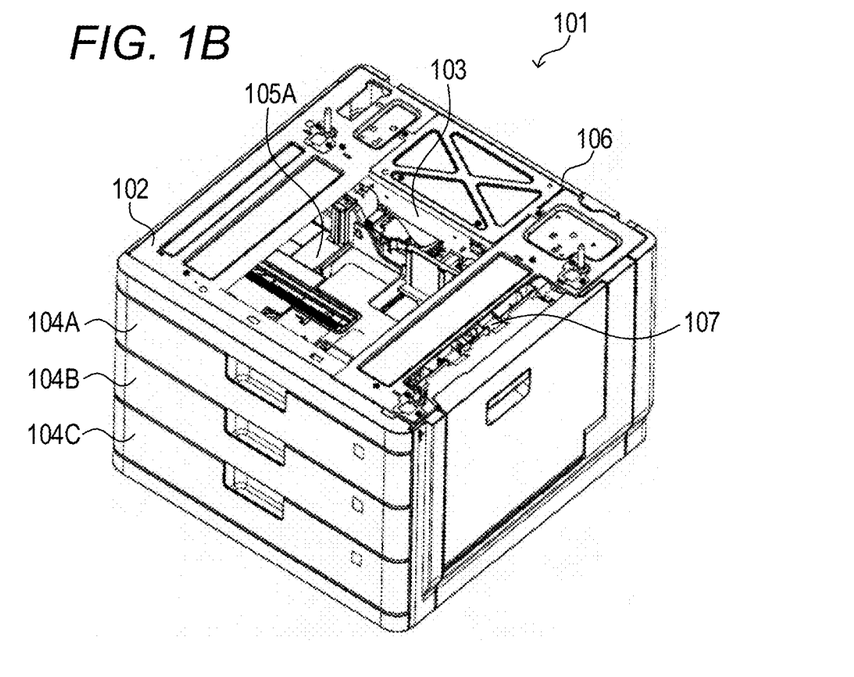

FIG. 1A and FIG. 1B are views for illustrating a sheet feeding apparatus 101. As illustrated in FIG. 1A, the sheet feeding apparatus 101 according to an embodiment is provided in an image forming apparatus 1. The image forming apparatus 1 includes an image forming portion 10 configured to form an image on a sheet (recording medium) and the sheet feeding apparatus 101 configured to feed a sheet to the image forming portion 10. As illustrated in FIG. 1B, the sheet feeding apparatus 101 includes a main frame 102 having a side plate 103 and a plurality of sheet cassettes 104A, 104B, and 104C configured to store sheets. The side plate 103 forms a part of the main frame 102. The sheet feeding apparatus 101 further includes a feed unit (not shown) and lifter driving units 206 and 207, which are illustrated in FIG. 2.

The plurality of sheet cassettes 104A, 104B, and 104C are supported within the main frame 102 so as to be able to be withdrawable from the main frame 102. The sheet cassettes 104A, 104B, and 104C include sheet cassette main bodies (main body portions) 105A, 105B (FIGS. 4), and 105C (not shown), respectively, which are made of a resin. Each of the sheet cassette main bodies 105A, 105B (FIGS. 4), and 105C (not shown) is provided with a lift plate (not shown). A sheet bundle is stacked on the lift plate (not shown). The lifter driving units 206 and 207 are coupled to driving gears (not shown) included in each of the sheet cassettes 104A, 104B, and 104C. The lift plate is raised in conjunction with the rotation of the driving gears by the lifter driving units 206 and 207, to thereby raise the uppermost sheet in the sheet bundle to a feedable position. The uppermost sheet that has been raised to the feedable position is separated from the remaining sheets in the sheet bundle one by one by the feed unit to be fed to a sheet feeding apparatus outlet 107.

Figure 2:
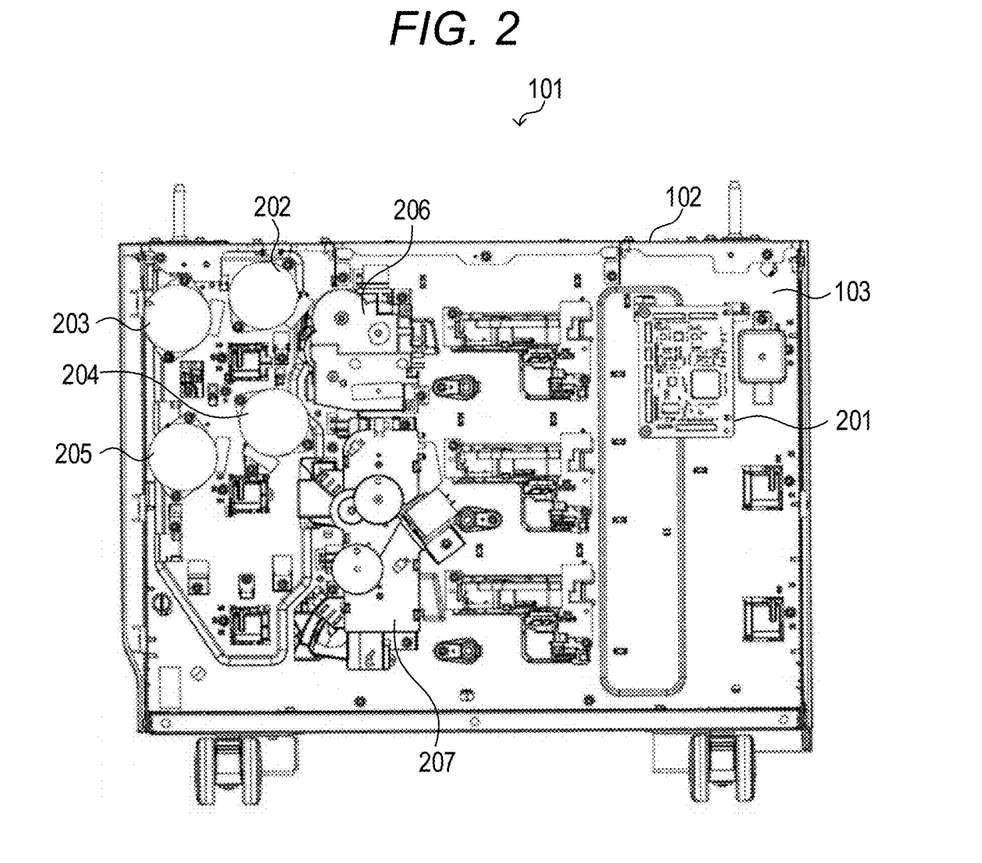
FIG. 2 is a back view of the sheet feeding apparatus with a back cover removed.

FIG. 2 is a back view of the sheet feeding apparatus 101 with a back cover 106 removed. An electric circuit board 201, motors 202, 203, 204, and 205, and the lifter driving units 206 and 207 are mounted to the side plate 103 of the main frame 102. The electric circuit board 201 is arranged on the opposite side of the sheet cassettes 104A, 104B, and 104C with respect to the side plate 103. The electric circuit board 201 supplies power supplied from a power supply (not shown) to the motors (electrical components) 202, 203, 204, and 205 and the lifter driving units (electrical components) 206 and 207 through cables (not shown). The motors 202 and 203 drive, via a driving gear train (not shown), a feed unit (not shown) configured to feed a sheet bundle stacked on the sheet cassette 104A. The motors 204 and 205 drive a feed unit (not shown) configured to feed a sheet bundle stacked on each of the sheet cassettes 104B and 104C. The lifter driving unit 206 raises the lift plate of the sheet cassette 104A. The lifter driving unit 207 raises the lift plate of each of the sheet cassettes 104B and 104C.

(Support Portion)

Figure 3A:
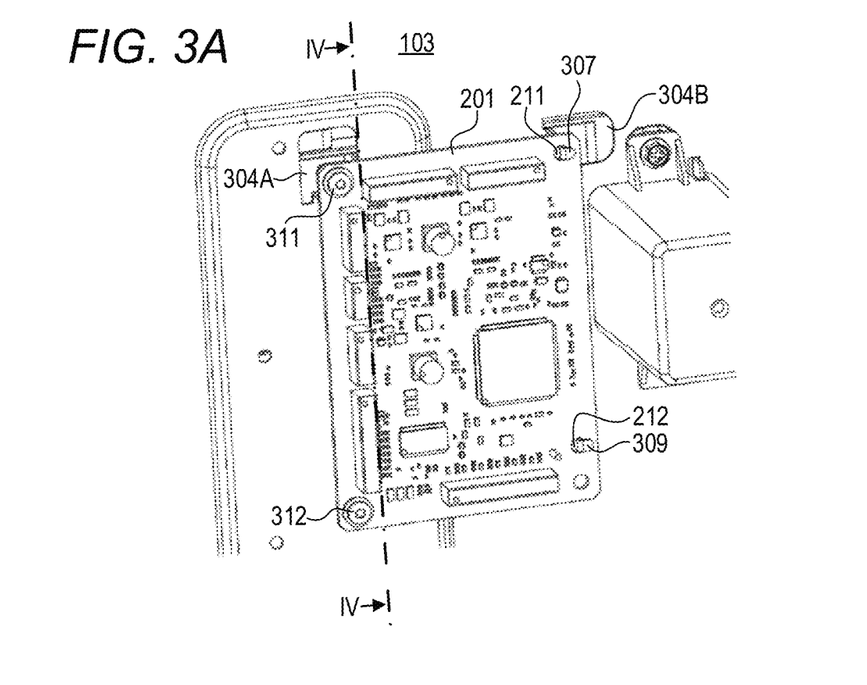
FIG. 3A and FIG. 3B are views for illustrating upper support portions and lower support portions.
Figure 3B:
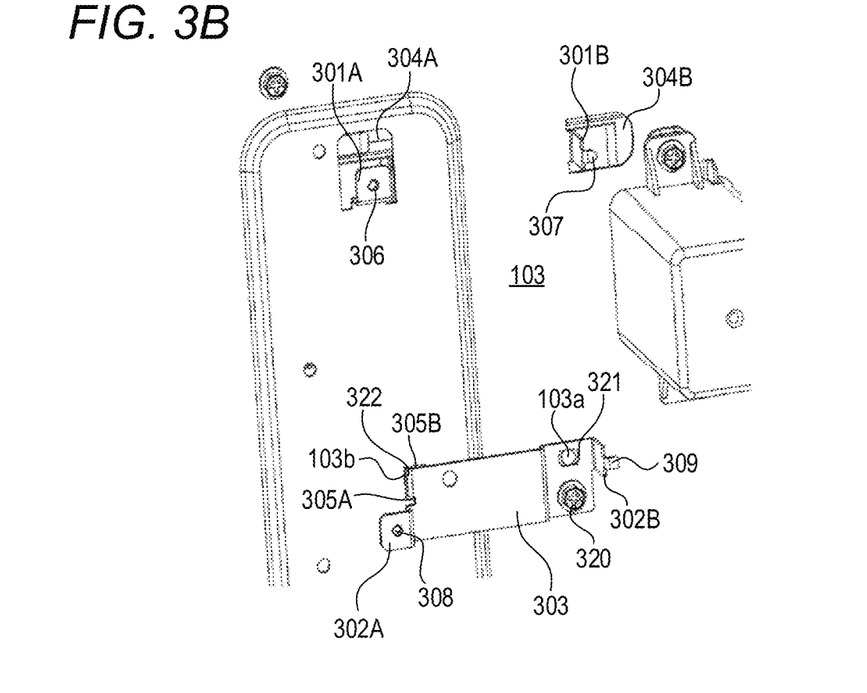
Figure 4:
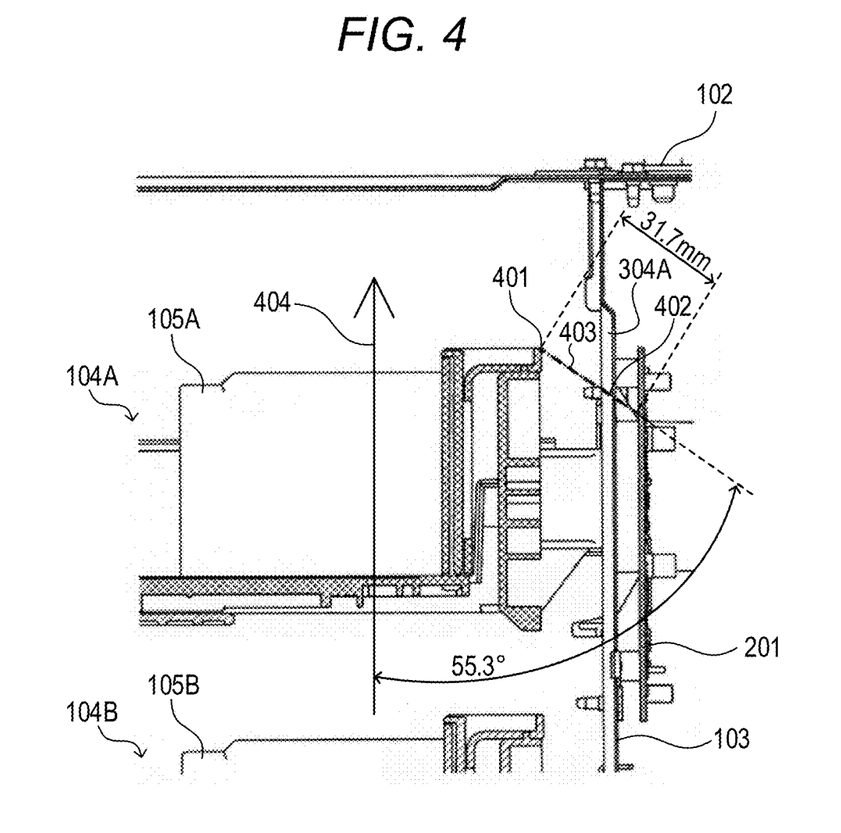
FIG. 4 is a cross-sectional view taken along the line IV-IV of FIG. 3A.

Next, referring to FIG. 3A, FIG. 3B, and FIG. 4, upper support portions 301A and 301B and lower support portions 302A and 302B that are configured to support the electric circuit board 201 are described. FIG. 3A and FIG. 3B are views for illustrating the upper support portions 301A and 301B and the lower support portions 302A and 302B. FIG. 3A is a view for illustrating the electric circuit board 201 supported on the side plate 103 by the upper support portions 301A and 301B and the lower support portions 302A and 302B. FIG. 3B is a view for illustrating the upper support portions 301A and 301B and the lower support portions 302A and 302B with the electric circuit board 201 removed. The upper support portions 301A and 301B are formed integrally with the side plate 103. The lower support portions 302A and 302B are formed on a separate part (supporting member) 303 different from the side plate 103. The separate part 303 is formed with a positioning hole (positioning portion) 321 and a positioning projection (positioning portion) 322. The positioning hole 321 is fitted with a positioning projection 103a provided at the side plate 103, and the positioning projection 322 is fitted into a positioning hole 103b formed in the side plate 103, to thereby achieve the positioning of the separate part 303 with respect to the side plate 103. The separate part 303 is mounted to the side plate 103 by a screw 320.

Upper opening portions 304A and 304B for integrally forming the upper support portions 301A and 301B on the side plate 103 are formed in a vicinity of the upper support portions 301A and 301B, respectively. In a vicinity of the separate part 303, lower opening portions 305A and 305B are formed between the side plate 103 and the separate part 303. The upper support portion 301A is formed with a screw hole 306 into which a screw 311 for fixing the electric circuit board 201 to the upper support portion 301A is to be screwed. The upper support portion 301B is provided with a hook claw 307 to be engaged with a hole 211 formed in the electric circuit board 201 so as to fix the electric circuit board 201 to the upper support portion 301B. The upper support portions 301A and 301B are formed by cutting out and bending a part of the side plate 103.

The lower support portion 302A is formed with a screw hole 308 into which a screw 312 for fixing the electric circuit board 201 to the lower support portion 302A is to be screwed. The lower support portion 302B is provided with a hook claw 309 to be engaged with a hole 212 formed in the electric circuit board 201 so as to fix the electric circuit board 201 to the lower support portion 302B. The lower support portion 302A, the lower support portion 302B, and the hook claw 309 are provided to the separate part 303, and the screw hole 308 is also formed in the separate part 303. In a vicinity of the separate part 303, the lower opening portions 305A and 305B are provided.

(Positional Relationship Between Electric Circuit Board and Sheet Cassette)

Now, referring to FIG. 4, a positional relationship between the electric circuit board 201 and the sheet cassette 104A is described. FIG. 4 is a cross-sectional view taken along the line IV-IV of FIG. 3A. The sheet cassettes 104A and 104B include sheet cassette main bodies 105A and 105B, respectively. The sheet cassette main bodies 105A and 105B are made of a polystyrene material having a flame retardant grade HB. There are drawn line segments (line segment 403 as an example) extending from arbitrary points (point 401 as an example) in the sheet cassette main body 105A and passing through arbitrary points in the upper opening portion 304A (304B) (point 402 in the upper opening portion 304A as an example) to reach the electric circuit board 201. In addition, a vertical line 404 extending from bottom to top along the gravity direction is drawn. Of such line segments starting from arbitrary points in the sheet cassette main body 105A, passing through arbitrary points in the upper opening portion 304A (304B), and extending until reaching the electric circuit board 201, all the line segments having a length of 50 mm or less form an angle of 45° or more with the vertical line 404.

In the embodiment illustrated in FIG. 4, an angle formed between the line segment 403 extending from the point 401 in the sheet cassette main body 105A and passing through the point 402 in the upper opening portion 304A to reach the electric circuit board 201 and the vertical line 404 is minimized. The length of the line segment 403 is 31.7 mm, and the angle formed between the line segment 403 and the vertical line 404 is 55.3°. Therefore, of the line segments starting from arbitrary points in the sheet cassette main body 105A, passing through arbitrary points in the upper opening portion 304A, and extending until reaching the electric circuit board 201, all the line segments having a length of 50 mm or less form an angle of 45° or more with respect to the vertical line 404. Although not shown in FIG. 4, a positional relationship between the electric circuit board 201 and the sheet cassette main body 105A in terms of the upper opening portion 304B is the same as the positional relationship between the electric circuit board 201 and the sheet cassette main body 105A in terms of the upper opening portion 304A, which is illustrated in FIG. 4. It is assumed here that the sheet cassette main body 105A also includes a separate part having a flame retardant grade lower than the flame retardant grade V-2 and mounted to the sheet cassette main body 105A.

(Range in Which Resin Material Having Flame Retardant Grade Lower Than Flame Retardant Grade V-2 Cannot Be Arranged)

Figure 5A:
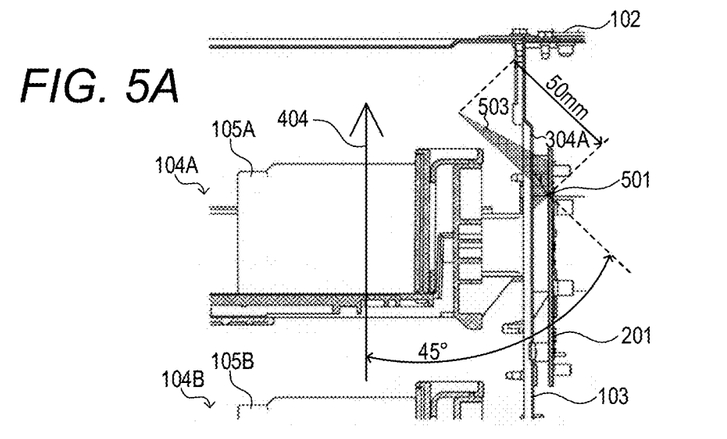
FIG. 5A, FIG. 5B, and FIG. 5C are views for illustrating fire spreading ranges in an embodiment.
Figure 5B:
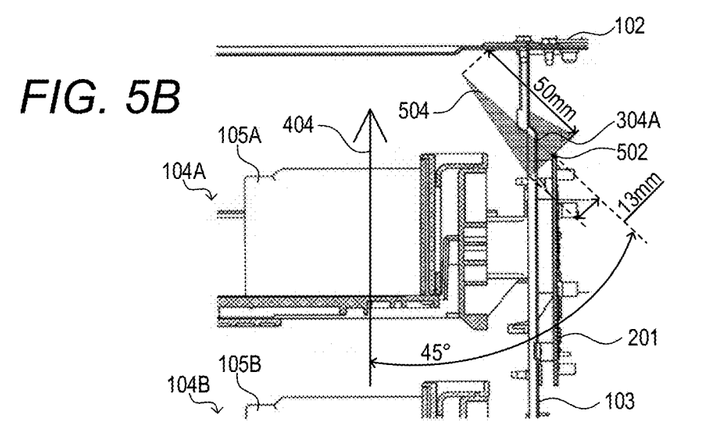
Figure 5C:
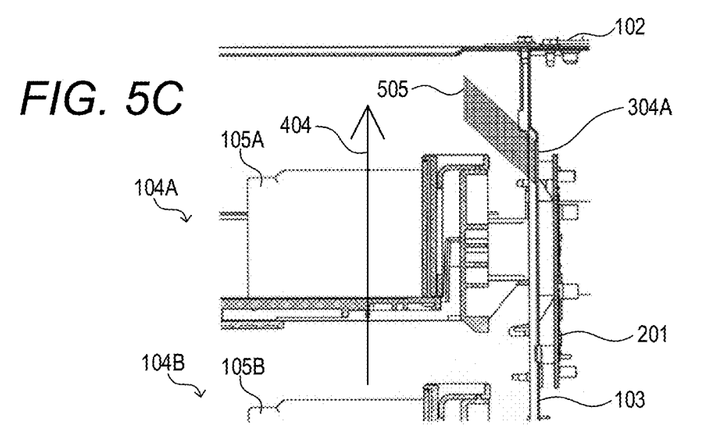

Now, referring to FIG. 5A, FIG. 5B, and FIG. 5C, a range in which a resin material having a flame retardant grade lower than the flame retardant grade V-2 cannot be arranged in the sheet feeding apparatus 101 in accordance with the standard IEC 62368-1 2nd Edition is described. FIG. 5A, FIG. 5B, and FIG. 5C are views for illustrating fire spreading ranges 503, 504, and 505 in an embodiment. FIG. 5A is a view for illustrating the fire spreading range 503 required to be considered when a point 501 on the electric circuit board 201 is regarded as a source of fire caused by the electric circuit board 201. FIG. 5B is a view for illustrating the fire spreading range 504 required to be considered when a point 502 on the electric circuit board 201 is regarded as a source of fire caused by the electric circuit board 201. FIG. 5C is a view for illustrating the fire spreading range 505 required to be considered in terms of a direction from the entire upper opening portion 304A toward the sheet cassette main body 105A based on the fire spreading range 503 illustrated in FIG. 5A and the fire spreading range 504 illustrated in FIG. 5B. In accordance with the standard IEC 62368-1 2nd Edition, it is not possible to arrange a resin material having a flame retardant grade lower than the flame retardant grade V-2 within the fire spreading range 505. In the sheet feeding apparatus 101 according to an embodiment, of the line segments starting from arbitrary points in the sheet cassette main body 105A, passing through arbitrary points in the upper opening portion 304A or 304B, and extending until reaching the electric circuit board 201, all the line segments having a length of 50 mm or less form an angle of 45° or more with respect to the vertical line 404. Therefore, the sheet feeding apparatus 101 according to an embodiment is configured so as to prevent the sheet cassette main body 105A from entering the fire spreading range 505. When the electric circuit board 201 is assumed to be the source of fire, the fire spreading range 505 passing through the upper opening portion 304A is only required to be located above the sheet cassette main body 105A of the sheet cassette 104A arranged at an uppermost position among the plurality of sheet cassettes 104A, 104B, and 104C. That is, when the electric circuit board 201 is assumed to be the source of fire, the sheet cassette main body 105A of the sheet cassette 104A arranged at an uppermost position among the plurality of sheet cassettes 104A, 104B, and 104C is only required to be located outside the fire spreading range 505 passing through the upper opening portion 304A.

(Dimensions of Lower Opening Portion)

Figure 6:
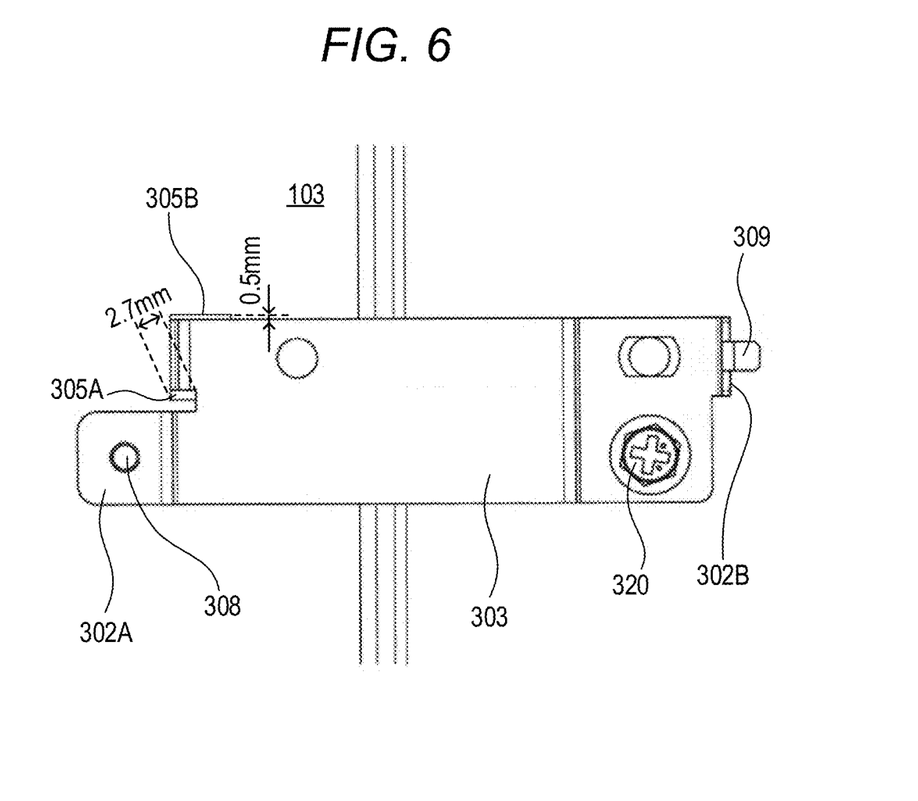
FIG. 6 is an enlarged view of lower opening portions.

Now, referring to FIG. 6, the dimensions of the lower opening portions 305A and 305B formed between the side plate 103 and the separate part 303 are described. FIG. 6 is an enlarged view of the lower opening portions 305A and 305B. The lower opening portions 305A and 305B formed between the side plate 103 and the separate part 303 have a dimension of 5 mm or less with respect to every direction, or have a width of 1 mm or less. In accordance with the standard IEC 62368-1 2nd Edition, an opening portion in a barrier for preventing fire spread is required to have a dimension of 5 mm or less with respect to every direction, or have a width of 1 mm or less. The dimension of the lower opening portion 305A in an embodiment is 2.7 mm at the largest length. The width of the lower opening portion 305B is 0.5 mm Therefore, the lower opening portions 305A and 305B in an embodiment satisfy the standard for the side plate 103 and the separate part 303 in order to function as a barrier for preventing a fire from spreading from the electric circuit board 201. When the lower support portions 302A and 302B are arranged above a position that is 50 mm below the sheet cassette main body 105C arranged at a lowermost position among the plurality of sheet cassette main bodies 105A, 105B, and 105C, the lower opening portions 305A and 305B in an embodiment may be formed.

Reference Example

Figure 7:
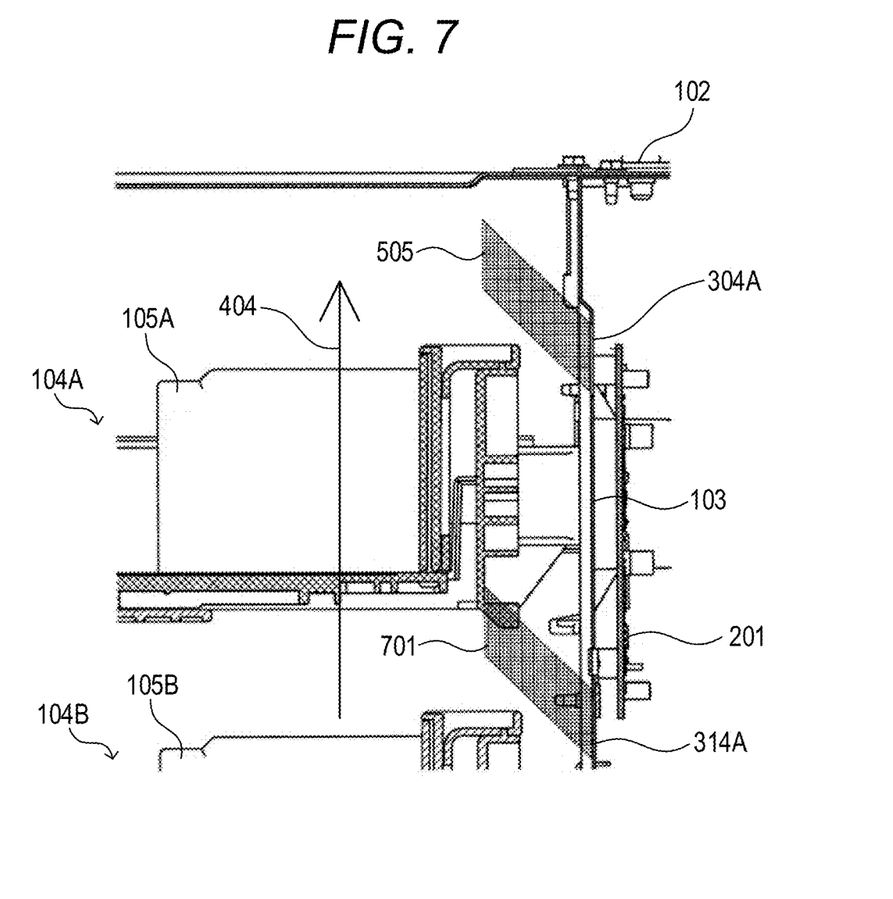
FIG. 7 is a view for illustrating fire spreading ranges in a reference example.

Suppose that the lower support portions 302A and 302B are formed integrally with the side plate 103 in the same manner as the upper support portions 301A and 301B, opening portions similar to the upper opening portions 304A and 304B are formed in a vicinity of the lower support portions 302A and 302B. Now, referring to FIG. 7, a fire spreading range 701 obtained when lower opening portions 314A and 314B (not shown) having the same area as the upper opening portions 304A and 304B are located in a vicinity of the lower support portions 302A and 302B is described. FIG. 7 is a view for illustrating the fire spreading ranges 505 and 701 in a reference example. In the reference example illustrated in FIG. 7, the fire spreading range 505 of the upper opening portions 304A and 304B is located so as to prevent a fire from spreading to the sheet cassette main body 105A. The fire spreading range 701 of the lower opening portions 314A and 314B (not shown) is located so as to prevent a fire from spreading to the sheet cassette main body 105B. In the case of the reference example, the sheet cassette main body 105A can enter the fire spreading range 701. In this manner, when the lower support portions 302A and 302B are formed integrally with the side plate 103, it is not possible to locate the lower opening portions 314A and 314B (not shown) so as to prevent both the sheet cassette main bodies 105A and 105B from entering the fire spreading ranges 505 and 701.

Meanwhile, according to an embodiment, the lower support portions 302A and 302B are formed in the separate part 303, and the upper opening portions 304A and 304B can be located so as to prevent both the sheet cassette main bodies 105A and 105B from entering the fire spreading range 505. In addition to the forming of the lower support portions 302A and 302B in the separate part 303, the upper support portions 301A and 301B may be formed in a separate part different from the side plate 103. In this case, the dimension of an upper opening portion formed between the separate part formed with the upper support portions 301A and 301B and the side plate 103 is set to 5 mm or less with respect to every direction, or the width of the upper opening portion is set to 1 mm or less. Through providing two separate parts, it is possible to improve the degree of freedom in position of the electric circuit board 201 mounted to the side plate 103. However, the number of separate parts increases by one when compared to the sheet feeding apparatus 101 according to an embodiment. With the sheet feeding apparatus 101 according to an embodiment, the positional relationship between the sheet cassettes 104A, 104B, and 104C and the electric circuit board 201 is optimized, and an increase in number of supporting components for supporting the electric circuit board 201 is suppressed, to thereby suppress an increase in number of assembly steps.

According to an embodiment, it is possible to satisfy the standard IEC 62368-1 2nd Edition while suppressing an increase in number of components.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-079127, filed Apr. 18, 2019, which is hereby incorporated by reference herein in its entirety.

What is claimed is:

1. A sheet feeding apparatus, comprising:
an electrical component;
a main frame;
a side plate which forms a part of the main frame;
a sheet cassette supported within the main frame so as to be withdrawable from the main frame, and including a main body portion made of a resin;
an electric circuit board arranged on an opposite side of the sheet cassette with respect to the side plate, and configured to supply power to the electrical component;
an upper support portion formed integrally with the side plate, and configured to support the electric circuit board;
an upper opening portion provided in the side plate in a vicinity of the upper support portion;
a lower support portion provided at a separate part mounted to the side plate, and configured to support the electric circuit board; and
a lower opening portion provided between the side plate and the separate part,
wherein all line segments having a length of 50 mm or less, among line segments starting from arbitrary points in the main body portion of the sheet cassette, passing through arbitrary points in the upper opening portion, and extending until reaching the electric circuit board, form an angle of 45° or more with respect to a vertical line extending from bottom to top along a gravity direction, and
wherein the lower opening portion has a dimension of 5 mm or less with respect to every direction or a width of 1 mm or less.

2. The sheet feeding apparatus according to claim 1, wherein a fire spreading range passing through the upper opening portion from a source of fire caused by the electric circuit board is located above the main body portion of the sheet cassette.

3. The sheet feeding apparatus according to claim 2, further comprising a plurality of sheet cassettes,
wherein a main body portion of a sheet cassette arranged at an uppermost position among the plurality of sheet cassettes is located outside the fire spreading range passing through the upper opening portion from the source of fire caused by the electric circuit board.

4. The sheet feeding apparatus according to claim 3, wherein the lower support portion is located above a position that is 50 mm below a main body portion of a sheet cassette located at a lowermost position among the plurality of sheet cassettes.

5. The sheet feeding apparatus according to claim 1, wherein the separate part is mounted to the side plate by a screw.

6. The sheet feeding apparatus according to claim 1, wherein the separate part includes a positioning portion configured to position the separate part with respect to the side plate.

7. The sheet feeding apparatus according to claim 1, wherein the lower support portion includes a screw hole formed in the separate part and a hook claw provided at the separate part.

* * * * *